(12) United States Patent
Kodabakshian

(10) Patent No.: US 8,944,485 B1
(45) Date of Patent: Feb. 3, 2015

(54) DOUBLE DUTY SHADE SYSTEM

(71) Applicant: Maria H. Kodabakshian, Northridge, CA (US)

(72) Inventor: Maria H. Kodabakshian, Northridge, CA (US)

(*) Notice: Subject to any disclaimer, the term of this patent is extended or adjusted under 35 U.S.C. 154(b) by 0 days.

(21) Appl. No.: 13/800,657

(22) Filed: Mar. 13, 2013

Related U.S. Application Data

(60) Provisional application No. 61/610,492, filed on Mar. 14, 2012.

(51) Int. Cl.
*B60J 3/02* (2006.01)
*E06B 9/44* (2006.01)

(52) U.S. Cl.
CPC ..... *B60J 3/02* (2013.01); *E06B 9/44* (2013.01)
USPC ............ 296/97.8; 160/370.22; 296/152

(58) Field of Classification Search
USPC ............ 296/97.8, 97.9, 152; 160/DIG. 3, 160/370.22, 120, 122
See application file for complete search history.

(56) References Cited

U.S. PATENT DOCUMENTS

| | | | | |
|---|---|---|---|---|
| 4,647,102 A | * | 3/1987 | Ebrahimzadeh | 160/84.04 |
| 4,707,018 A | | 11/1987 | Gavagan | |
| 4,988,139 A | | 1/1991 | Yamada | |
| 5,605,370 A | * | 2/1997 | Ruiz | 296/152 |
| 5,673,742 A | | 10/1997 | Gabb | |
| 6,705,381 B2 | * | 3/2004 | Huang | 160/370.23 |
| 7,934,764 B2 | * | 5/2011 | Hansen | 296/97.8 |
| 8,556,328 B1 | * | 10/2013 | Middleton | 296/143 |
| 8,590,959 B2 | * | 11/2013 | Durm et al. | 296/97.8 |
| 2010/0013262 A1 | * | 1/2010 | Shu | 296/97.8 |

FOREIGN PATENT DOCUMENTS

DE  3822378 A1 * 1/1990

* cited by examiner

*Primary Examiner* — Jason S Morrow
(74) *Attorney, Agent, or Firm* — Emery L. Tracy; Ruth Eure

(57) ABSTRACT

A window shade system for covering at least a portion of a car window of a car is provided. The car window is mounted within a window frame with the window frame having a top edge, a bottom edge, and a pair of side edges. The window shade system comprises a first shade mounted to the top edge or the side edge of the window frame and a second shade mounted to the bottom edge or the side edge of the window frame. The first shade and the second shade are independently movable to cover at least a portion of the car window.

19 Claims, 4 Drawing Sheets

US 8,944,485 B1

DOUBLE DUTY SHADE SYSTEM

The present application claims the benefit of priority of provisional patent application Ser. No. 61/610,492, filed on Mar. 14, 2012, entitled "Double Duty Shade".

BACKGROUND OF THE INVENTION

1. Field of the Invention

This invention relates generally to a double duty shade system and, more particularly, the invention relates to a double duty shade system providing a two-part, sun-blocking assembly specially designed for use on car door windows.

2. Description of the Prior Art

While spiriting down the highway, many drivers seek to bask in the warm summer air by driving with their door and sunroof windows open. Aided by the motion of the car, breezes sweeping through open car windows provide a refreshing mixture of balmy and cool air that invigorates the face and body in a manner that the auto's air conditioning system cannot. Further, this more natural means of staying cool while in the car helps to preserve gas mileage, as running the AC can strain an auto's resources. While open-window driving can foster senses of freedom, spirit, and comfort, this practice can also invite irritation. Specifically, the arms and face are perhaps the most susceptible areas of the body in regards to sunburns and skin cancer. In fact, many experience severe sunburns and uneven tan lines simply from the sunshine that penetrates through the window of their vehicles. Directly exposed to the sun when driving, most people do not realize the vital importance of adequate sun protection for these parts of the body.

SUMMARY

The present invention is a window shade system for covering at least a portion of a car window of a car. The car window is mounted within a window frame with the window frame having a top edge, a bottom edge, and a pair of side edges. The window shade system comprises a first shade mounted to the top edge or the side edge of the window frame and a second shade mounted to the bottom edge or the side edge of the window frame. The first shade and the second shade are independently movable to cover at least a portion of the car window.

In addition, the present invention is a method for covering at least a portion of a car window of a car. The car window is mounted within a window frame with the window frame having a top edge, a bottom edge, and a pair of side edges. The method comprises mounting a first shade to the top edge or the side edge of the window frame, mounting a second shade to the bottom edge or the side edge of the window frame, and independently moving the first shade and the second shade to cover at least a portion of the car window.

The present invention further includes a window shade system for covering at least a portion of a car window of a car. The car window is mounted within a window frame with the window frame having a top edge, a bottom edge, and a pair of side edges. The window shade system comprises a first housing mounted to the top edge or the side edge of the window frame. A roller first shade is positioned within the first housing with first handles and tabs extending from the first shade. A second housing is mounted to the bottom edge or the side edge of the window frame. A roller second shade is positioned within the second housing with second handles and tabs extending from the second shade. The first shade and the second shade are independently movable to cover at least a portion of the car window.

DETAILED DESCRIPTION OF THE PREFERRED EMBODIMENTS

Figure 1:
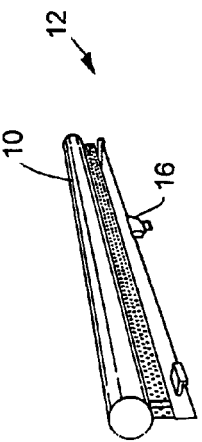
FIG. 1 is a perspective view illustrating a double duty shade system, constructed in accordance with the present invention.
Figure 3:
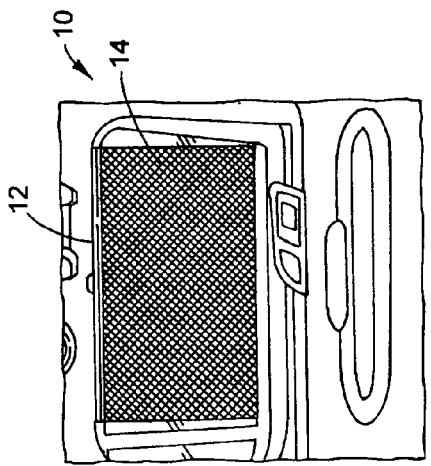
FIG. 3 is a perspective view illustrating the double duty shade system of FIG. 2, constructed in accordance with the present invention, with the second shade extended to cover the car window and releasably fastened to the first shade.
Figure 5:
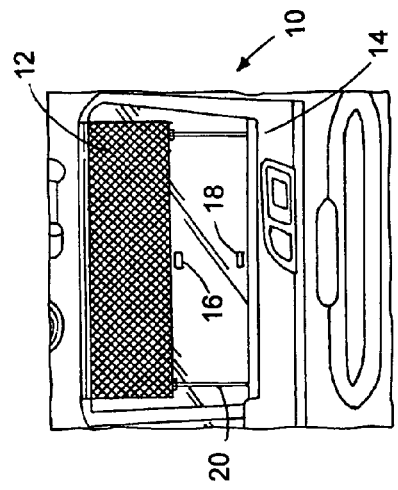
FIG. 5 is a perspective view illustrating the double duty shade system of FIG. 4, constructed in accordance with the present invention, with the first shade partially extended to cover a top portion of the car window.
Figure 2:
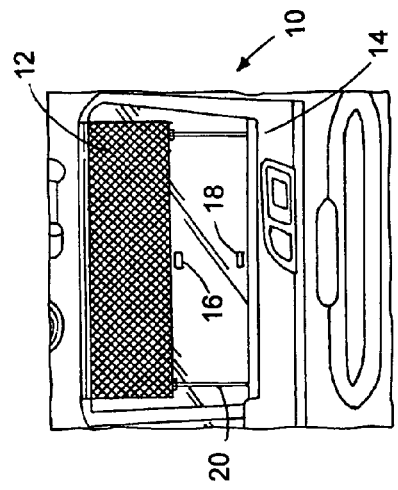
FIG. 2 is a perspective view illustrating the double duty shade system, constructed in accordance with the present invention, with a first shade installed above a car window and a second shade installed below a car window.
Figure 4:
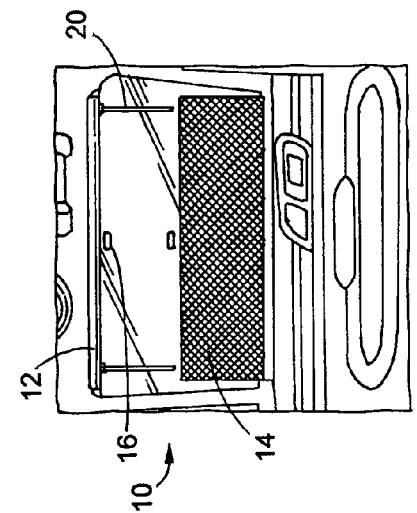
FIG. 4 is a perspective view illustrating another embodiment of the double duty shade system, constructed in accordance with the present invention, with the second shade partially extended to cover a bottom portion of the car window.
Figure 6:
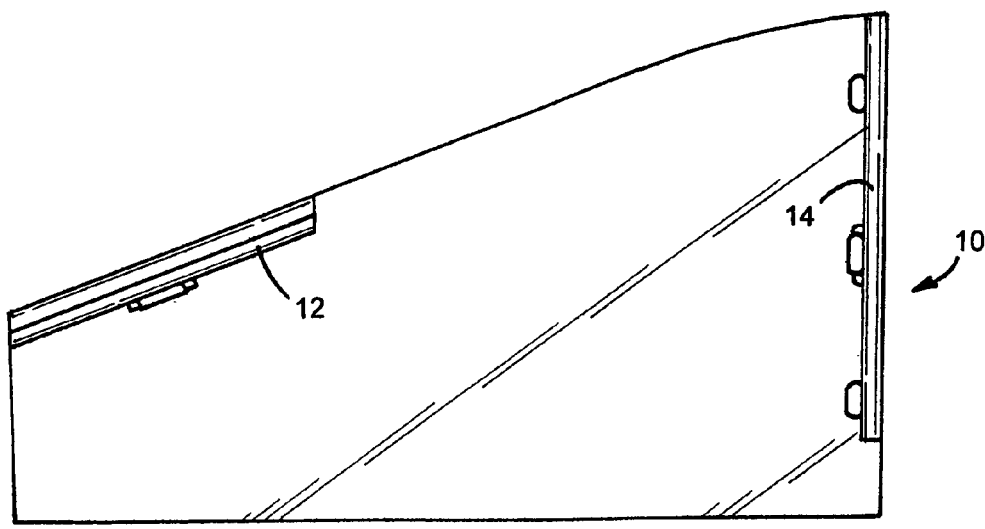
FIG. 6 is a front elevational view illustrating another embodiment of the double duty shade system, constructed in accordance with the present invention, with the first shade mounted above the window and the second shade mounted to the side of the window, both shades in a closed position.
Figure 7:
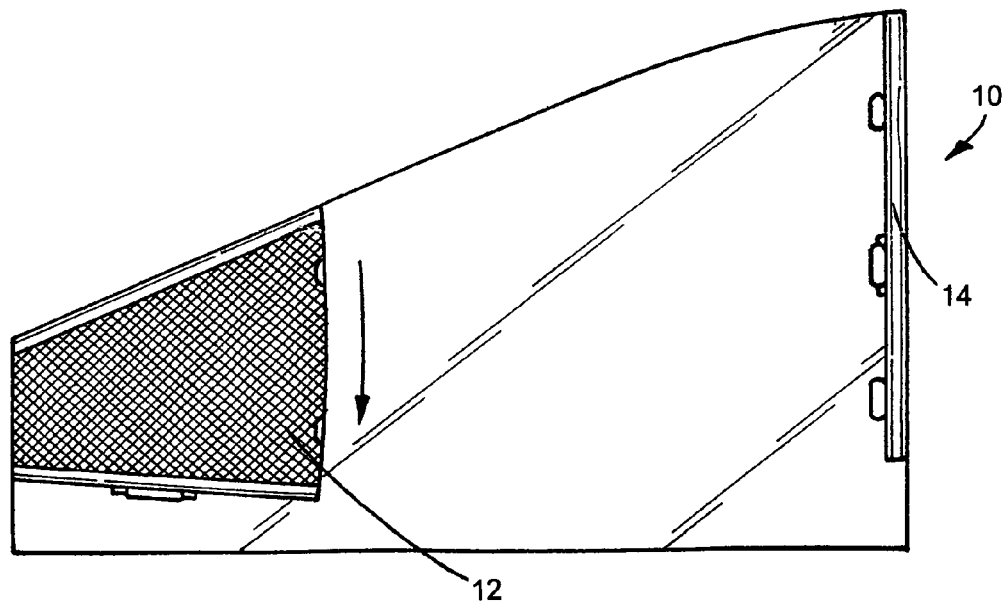
FIG. 7 is a front elevational view illustrating the double duty shade system of FIG. 6, constructed in accordance with the present invention, with the first shade partially extended to cover a portion of the car window and the second shade in the closed position.
Figure 8:
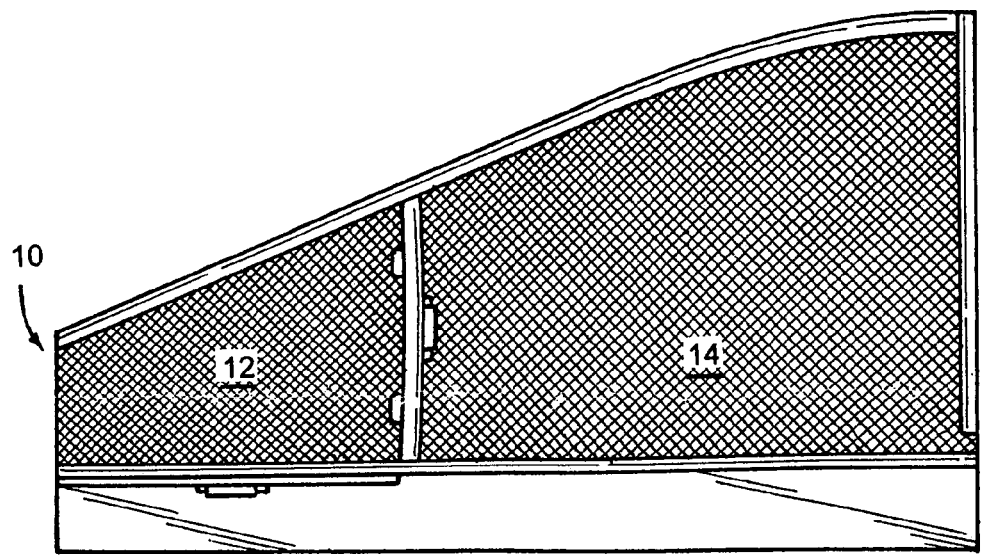
FIG. 8 is a front elevational view illustrating the double duty shade system of FIG. 6, constructed in accordance with the present invention, with the first shade partially extended to cover a portion of the car window and the second shade partially extended to cover another portion of the car window.
Figure 9:
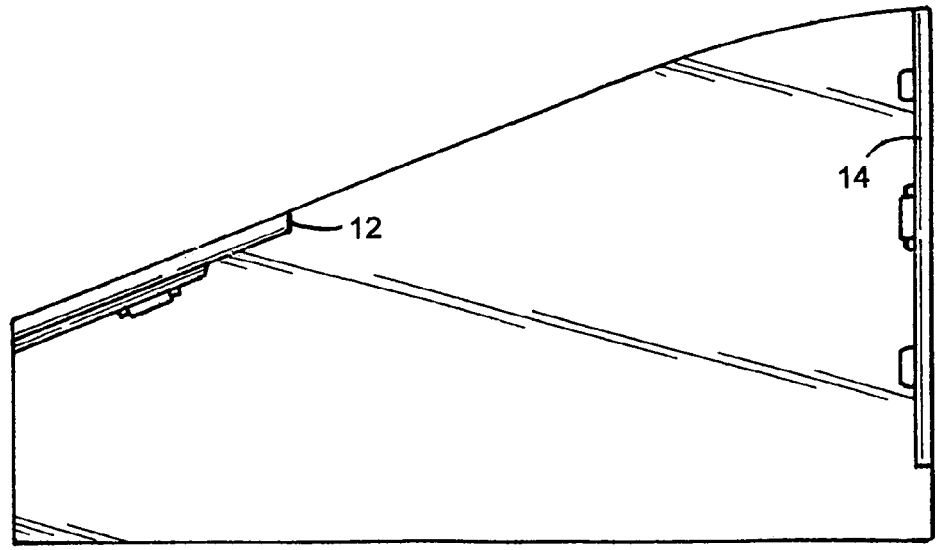
FIG. 9 is a front elevational view illustrating the double duty shade system of FIG. 6, constructed in accordance with the present invention, with the first shade and the second shade in a closed position.
Figure 10:
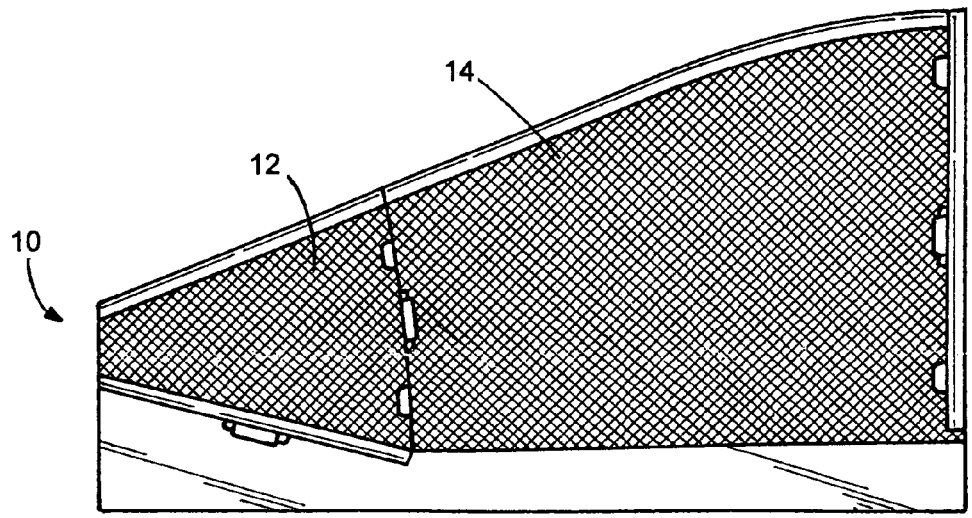
FIG. 10 is a front elevational view illustrating the double duty shade system of FIG. 6, constructed in accordance with the present invention, with the first shade partially extended to cover a portion of the car window and the second shade partially extended to cover another portion of the car window.
Figure 11:
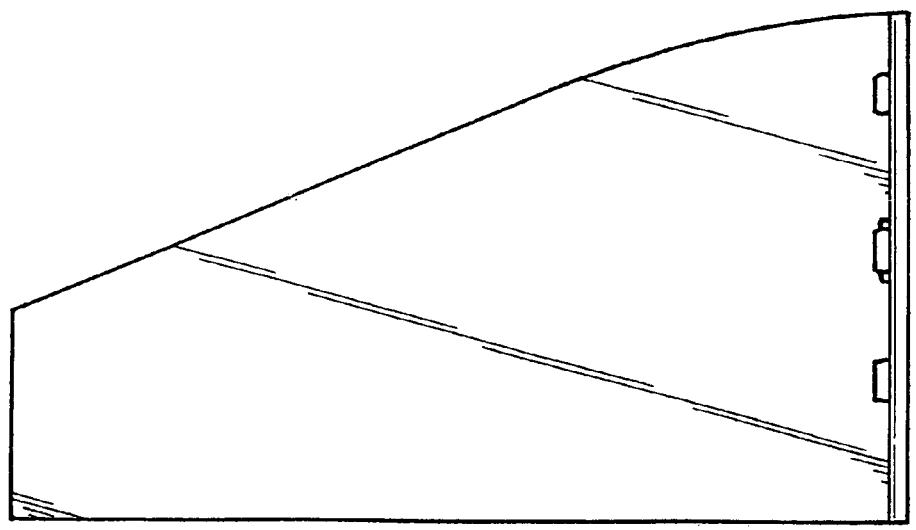
FIG. 11 is another front elevational view illustrating the double duty shade system of FIG. 6, constructed in accordance with the present invention.

As illustrated in FIGS. 1-10, the present invention is a double duty shade system, indicated generally at 10, providing a two-part, sun-blocking assembly specially designed for use on car door windows. The double duty shade system 10 of the present invention is offered in a variety of sizes to accommodate most vehicle models.

The double duty shade system 10 of the present invention consists of a first shade 12 and a second shade 14. Preferably, the first shade 12 and the second shade 14 are attachable roller systems configured to easily attach to the framework of the car door. The first shade 12 is a tubular plastic or metal housing containing the protective covering rolled into the housing. Handles and tabs 16 extended from the covering to facilitate release and adjustment of the protective covering found in the housing unit. The first cover 12 is preferably fabricated of a durable, sun blocking fabric mesh material. This material can be of an ultra-fine configuration, with up to one hundred thirty-two (132) holes per square inch or a similar variation. The first shade 12 attaches to the frame of the car door with the use of Velcro lined with 3M tape or double sided tape to secure the first shade 12 to the window frame of the door or a similar variation. The Velcro is preferably hidden underneath the car window weather-strip seal making it virtually invisible. The tabs 16 allow the motorists the ability to adjust the first shade 12 to the desired height and cover any portion of the car window.

The second shade 14 of the double duty shade system 10 of the present invention attaches to the bottom or the side of the window frame of the car with two clips lined with adhesive that open and close, thereby, securing the second shade 14 to the window frame or it attaches to the door with the use of Velcro lined 3M tape. The Velcro is hidden underneath the car window weather seal.

The second shade 14 of the double duty shade system 10 of the present invention serves two functions. First, the second shade 14 holds and secures to the first shade 12 while in use, and two, provides additional protection from the sun when the second shade 14 is utilized. The second shade 14 incorporates tabs and buttons 18 to facilitate the release of the protective poly mesh used to block the sun. The tabs allow the motorists the ability to adjust the shade to the desired height.

In another embodiment, the double duty shade system 10 of the present invention can have a pair of guide cords 20 extending vertically between the top and bottom of the car window, however, it is within the scope of the present invention to abstain from using the guide cords 20. The first shade 12 and the second shade 14 glide along the guide cords 20 and are held in place by friction or other means. In this manner, the first shade 12 can be extended downward to cover a portion or all of the car window and the second shade 14 can be extended upward to cover a portion or all of the car window either alone or simultaneously, depending on the desires of the user. In a preferred embodiment, the guide cords 20 are constructed of a flat stainless steel cord although constructing the guide cords 20 from a different material is within the scope of the present invention.

In still another embodiment, the first shade 12 of the double duty shade system 10 of the present invention is mounted to the door frame above the window and the second shade 14 is mounted to the door frame along the side of the window. Preferably, both the first shade 12 and the second shade 14 are secured to the door frame with 3M tape or the like and are nestled inside a tubular shaped plastic covering that stores and protects the first shade 12 and the second shade 14 when not in use. Both the first shade 12 and the second shade 14 incorporates tabs and buttons to facilitate the release of the poly mesh material. In this embodiment, the first shade 12 blocks the morning sun and can be used either alone or with the use of the second shade 14 securing the second shade 14 in place. The second shade 14 can only be used when shade one 12 is extended. The space at the bottom of the window is intentionally left uncovered to ensure that the driver can see the side mirrors of the vehicle without obstruction. Also, the first shade 12 has a hinge with a joint connector the releasably locks and secures the first shade 12 in a fan-like open position.

Also, in a preferred embodiment, the first shade 12 and the second shade 14 are constructed from the same type of material. However, it is within the scope of the present invention to construct the first shade 12 from a first type of material and to construct the second shade 14 from a second type of material with the first material being a different than the second material. In this manner, the user can determine the appropriate amount of sun blockage by deciding to use either the first shade 12 or the second shade 14.

The manner of use of the double duty shade system 10 of the present invention will now be described. It will be understood by those skilled in the art that the manner of use of the double duty shade system 10 described herein is merely one method of use and other methods of use of the double duty shade system 10 are within the scope of the present invention.

The double duty shade system 10 of the present invention is installed by following easily understood package instructions so that motorists can have the double duty shade system 10 ready to work in a matter of seconds. The double duty shade system 10 allows vehicles to stay cool while protecting drivers and passengers from the harmful rays of the sun. In this manner, users can bask in this more natural way of cooling; thus eliminating the need to constantly run the car's air conditioning system. As a result, gas can be saved, as well as money. Moreover, the double duty shade system 10 shields sensitive skin from the glaring sunlight that pours in through a vehicle's window. The double duty shade system provides ample protection to the many users who must travel for work, school, or enjoyment.

The double duty shade system 10 of the present invention is a retractable, two-part, adjustable sun-blocking window shade system designed specifically for use on car door windows. The design allows the user to open and close the window while the double duty shade system 10 is in use. When not in use, the first shade and the second shade of the double duty shade system 10 retract into a cylindrical shaped housing unit for easy storage. The double duty shade system 10 is configured to easily attach to the framework of car doors. The user will never again reach for or scramble behind the driver's seat for a window shade.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A window shade system for covering at least a portion of a car window of a car, the car window mounted within a window frame, the window frame having a top edge a bottom edge, and a pair of side edges between the top edge and the bottom edge, the window shade system comprising:
 a first shade mounted to the top edge or side edge of the window frame; and
 a second shade mounted to the bottom edge or the side edge of the window frame;
 wherein the first shade holds and secures the second shade while the second shade is in use; and
 wherein the first shade and the second shade are independently movable to cover at least a portion of the car window; and wherein the first shade and the second shade are attachable roller systems configured to attach to the window frame.

2. The window shade system of claim 1 and further comprising:
a tubular plastic or metal housing containing the respective shade rolled into the housing.

3. The window shade system of claim 1 and further comprising:
first handles and tabs extending from the first shade; and
second handles and tabs extending from the second shade.

4. The window shade system of claim 1 wherein the first shade is constructed from a first material type and the second shade is constructed from a second material type, the first material type and the second material type being the same type of material.

5. The window shade system of claim 1 wherein the first shade is constructed from a first material type and the second shade is constructed from a second material type, the first material type and the second material type are different types of material.

6. The window shade system of claim 1 and further comprising:
a pair of guide cords extending vertically between the top and bottom of the window frame, the first shade and the second shade gliding along the guide cords.

7. The window shade system of claim 6 wherein the first shade and second shade are releasably held along the guide cords by friction.

8. The window shade system of claim 6 wherein the second shade is secured to a side edge of the window frame, the first shade extendable downward to cover a portion or all of the car window and the second shade is extendable sideways to cover a portion or all of the car window either alone or simultaneously with each other.

9. The window shade system of claim 6 wherein the guide cords are constructed of a flat stainless steel cord.

10. A window shade system for covering at least a portion of a car window of a car, the car window mounted within a window frame, the window frame having a top edge, a bottom edge, and a pair of side edges, the window shade system comprising:
a first housing mounted to the top edge or the side edge of the window frame;
a roller first shade positioned within the first housing;
first handles and tabs extending from the first shade;
a second housing mounted to the bottom edge or the side edge of the window frame;
a roller second shade positioned within the second housing; and
second handles and tabs extending from the second shade;
wherein the second shade holds and secures the first shade while the second shade is in use; and
wherein the first shade and the second shade are independently movable to cover at least a portion of the car window.

11. The window shade system of claim 10 wherein the first shade is constructed from a first material type and the second shade is constructed from a second material type, the first material type and the second material type being the same type of material.

12. The window shade system of claim 11 wherein the first shade is constructed from a first material type and the second shade is constructed from a second material type, the first material type and the second material type are different types of material.

13. The window shade system of claim 10 and further comprising:
a pair of guide cords extending vertically between the top and bottom of the window frame, the first shade and the second shade gliding along the guide cords.

14. The window shade system of claim 13 wherein the first shade and second shade are releasably held along the guide cords by friction.

15. The window shade system of claim 10 wherein the second shade is secured to a side edge of the window frame, the first shade extendable downward to cover a portion or all of the car window and the second shade is extendable sideways to cover a portion or all of the car window either alone or simultaneously with each other.

16. The window shade system of claim 13 wherein the guide cords are constructed of a flat stainless steel cord.

17. A window shade system for covering at least a portion of a car window of a car, the car window mounted within a window frame, the window frame having a top edge a bottom edge, and a pair of side edges between the top edge and the bottom edge, the window shade system comprising:
a first shade mounted to the top edge or side edge of the window frame;
a second shade mounted to the bottom edge or the side edge of the window frame; and
a pair of guide cords extending vertically between the top and bottom of the window frame, the first shade and the second shade gliding along the guide cords;
wherein the first shade and the second shade are independently movable to cover at least a portion of the car window.

18. The window shade system of claim 17 wherein the first shade and second shade are releasably held along the guide cords by friction.

19. The window shade system of claim 17 wherein the second shade is secured to a side edge of the window frame, the first shade extendable downward to cover a portion or all of the car window and the second shade is extendable sideways to cover a portion or all of the car window either alone or simultaneously with each other.

* * * * *